(12) United States Patent
Zinnecker

(10) Patent No.: US 11,353,096 B2
(45) Date of Patent: Jun. 7, 2022

(54) BALL SCREW DRIVE AND SUPPORT BEARING FOR COMBINED VEHICLE BRAKE SYSTEM

(71) Applicant: SCHAEFFLER TECHNOLOGIES AG & CO. KG, Herzogenaurach (DE)

(72) Inventor: Michael Zinnecker, Berkley, MI (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 73 days.

(21) Appl. No.: 16/165,421

(22) Filed: Oct. 19, 2018

(65) Prior Publication Data
US 2020/0124146 A1 Apr. 23, 2020

(51) Int. Cl.
| | |
|---|---|
| *F16D 65/16* | (2006.01) |
| *F16H 25/22* | (2006.01) |
| *B60T 13/02* | (2006.01) |
| *F16C 19/06* | (2006.01) |
| *F16C 33/58* | (2006.01) |
| *F16D 125/40* | (2012.01) |

(52) U.S. Cl.
CPC .......... *F16H 25/2204* (2013.01); *B60T 13/02* (2013.01); *F16C 19/06* (2013.01); *F16C 33/583* (2013.01); *F16D 65/16* (2013.01); *F16D 2125/40* (2013.01)

(58) Field of Classification Search
CPC .. F16D 2125/40; F16D 65/16; F16H 2125/40; F16H 25/2204; B60T 13/02; F16C 19/06; F16C 33/583
See application file for complete search history.

(56) References Cited

U.S. PATENT DOCUMENTS

| | | | | |
|---|---|---|---|---|
| 5,027,667 | A | * | 7/1991 | Weyer ................. F16H 25/2266 74/424.92 |
| 6,691,837 | B1 | * | 2/2004 | Kapaan ................... F16D 65/18 188/72.1 |
| 2010/0320042 | A1 | * | 12/2010 | Giering ................. B60T 13/741 188/162 |
| 2011/0120247 | A1 | * | 5/2011 | Osterlaenger ....... F16H 25/2233 74/424.82 |
| 2016/0108999 | A1 | | 4/2016 | Kreutzer |
| 2019/0331180 | A1 | * | 10/2019 | Chelaidite ............... F16H 25/24 |

FOREIGN PATENT DOCUMENTS

EP 3208164 B1 * 11/2020 ........... F16D 55/226

\* cited by examiner

*Primary Examiner* — Randell J Krug
(74) *Attorney, Agent, or Firm* — Rutan & Tucker LLP; Hani Z. Sayed

(57) ABSTRACT

A ball screw drive comprises a spindle that includes a torque input portion and a body portion having a ball-screw drive inner raceway, wherein the body portion and torque input portion are met by a support bearing portion of the spindle that includes a support-bearing inner raceway grooved into a surface of the spindle, an outer ring including a support-bearing outer raceway and forming a channel with the support-bearing inner raceway of the spindle, and one or more support-bearing rolling elements arranged in the channel to contact the support-bearing inner raceway grooved into the surface the spindle.

17 Claims, 2 Drawing Sheets

BALL SCREW DRIVE AND SUPPORT BEARING FOR COMBINED VEHICLE BRAKE SYSTEM

TECHNICAL FIELD

The present disclosure relates to ball screw drives that may be utilized in brake systems.

BACKGROUND

Certain packaging requirements may require a ball screw drive to be placed in past compact locations. Furthermore, the cost of ball screw drives may need to be reduced. Past designs of ball screw drives may include a spindle washer and a separate set of thrust bearing washers on each side of the needles. Such designs may require the cost and packing requirements to be costly.

SUMMARY

According to one embodiment, a ball screw drive comprises a spindle that includes a torque input portion and a body portion having a ball-screw drive inner raceway, wherein the body portion and torque input portion are met by a support bearing portion of the spindle that includes a support-bearing inner raceway grooved into a surface of the spindle, an outer ring including a support-bearing outer raceway and forming a channel with the support-bearing inner raceway of the spindle, and one or more support-bearing rolling elements arranged in the channel to contact the support-bearing inner raceway grooved into the surface the spindle.

In a second embodiment, a spindle of a ball screw drive comprises a body portion including a ball-screw drive inner raceway configured to form a ball-screw channel with a ball-screw drive outer raceway of a ball-nut, a torque input portion configured to transfer torque, and a support bearing portion between the body portion and the torque input portion, wherein the support bearing portion is a circumferential groove in a surface of the spindle and configured to accommodate a support-bearing rolling element.

According to a third embodiment, a ball screw drive comprises a support bearing including an outer ring that includes a support-bearing outer raceway, one or more support-bearing rolling elements, and a spindle that includes a body portion including a ball-screw drive inner raceway. The spindle also includes a torque input portion configured to transfer torque from a vehicle actuation system and a support bearing portion of the spindle between the body portion and torque input portion, wherein the support bearing portion includes a support-bearing inner raceway with a circumferential groove in a surface of the spindle and forming a channel with the outer ring to accommodate the one or more support-bearing rolling elements.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
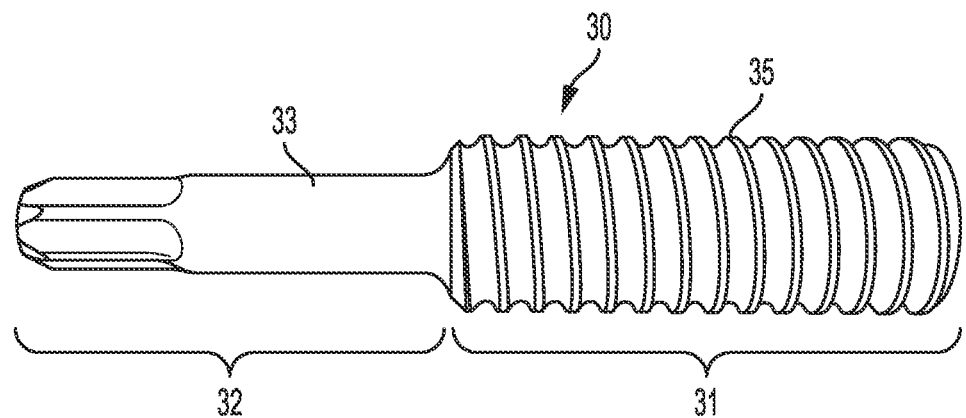
FIG. 1 discloses an overview of a spindle for an embodiment of the ball screw drive.

As shown in FIG. 1, an overview of a spindle for an embodiment of the ball screw drive is shown. Spindle 30 may also have a torque input portion 32 having an outer circumferential surface 33 and a body portion 31 having an outer circumferential surface 35. The torque input portion 32 has a smaller diameter than that of the body portion 31. The torque input portion 32 may not have a raceway in certain embodiments. The torque input portion 32 may be connected to an actuator (e.g. any actuator in a vehicle) that may transfer torque to the spindle 30. To connect to the actuator, the end of the spindle 30 at the torque input portion 32 may have a complementary shape to that of the actuator in order to engage. The actuator may be part of vehicle actuation system that is a parking brake actuation system or a brake boosting actuation system. The spindle 30 may then rotate upon torque being transferred onto the torque input portion, which in turn may cause the ball nut 40 to move in a linear-direction in response to the ball-nut rolling elements circulating along the ball screw raceway.

The torque input portion 32 and body portion 31 of the spindle 30 may be met by a support bearing portion 50 that may transition between the torque input portion 32 and body portion 31. The support bearing portion 50 may have a groove into the surface of the spindle. The groove of the surface of the spindle 30 at the support bearing portion 50 may be formed to create a raceway that will work in conjunction with an outer ring (not shown in FIG. 1). The raceway of the support bearing portion 50 may also be called a support-bearing inner raceway 50. The support-bearing inner raceway 50 may be a curved profile or helical grooves in order to accommodate one or more rolling elements (not shown in FIG. 1).

Figure 2:
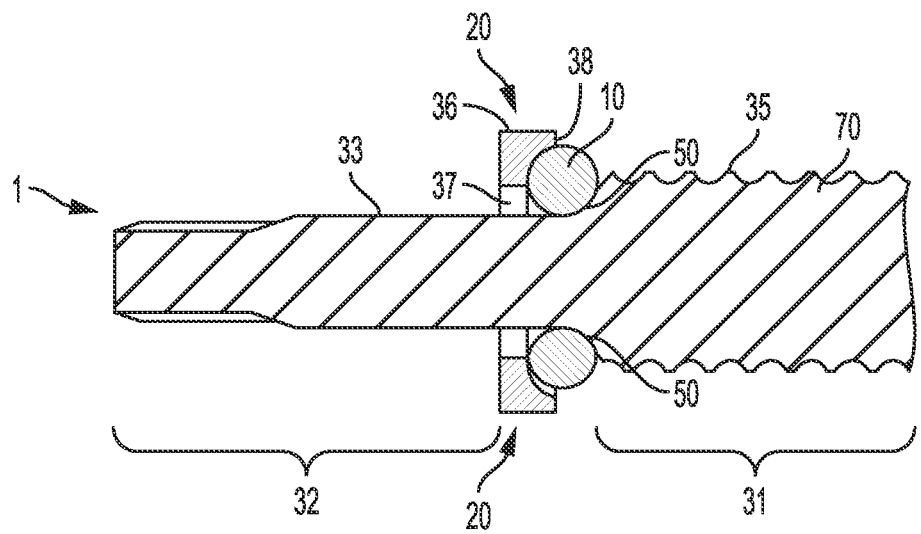
FIG. 2 discloses a cross-section of a spindle and a support bearing assembly of an embodiment of the ball screw drive.

As shown in FIG. 2, the ball screw drive 1 may include a spindle 30 with a body portion 31. The body portion 31 of the spindle 30 may include its own raceway that aligns with a raceway of the ball nut 40. The body portion's raceway is shown in FIG. 2 as a ball-screw inner raceway 70. The ball-screw inner raceway 70 of the body portion 31 may align with a raceway of the ball-nut (not shown), which may be referred to as a ball-screw outer raceway (not shown). The ball-nut may also be referred to as a linear actuator nut. The ball-screw inner raceway 70 and the ball-screw outer raceway may form a channel along the body portion 31 of the spindle 30 that accommodates one or more rolling elements. The one or more rolling elements of the body portion 31 may be called ball-nut rolling elements. During actuation of the ball screw, the rolling elements may circulate around the ball screw raceways and transfer load between the spindle and ball nut. The ball-screw inner raceway 70 and the ball-screw outer raceway may have a curved-profile or helical grooves to accommodate the rolling elements of the body portion 31. The ball-screw inner raceway 70 and the ball-screw outer raceway may have a mirrored profile, as well.

The torque input portion 32 and body portion 31 of the spindle 30 may be met by a support bearing portion 50. The support bearing portion 50 may have a chamfer or groove into the surface of the spindle 30. The chamfer of the surface of the spindle 30 at the support bearing portion 50 may be formed to create a raceway that will work in conjunction with an outer ring 20 located at the torque input portion 32 of the spindle 30. Unlike a typical ball screw drive that may have a separate support bearing ring, the spindle 30 may have the support bearing portion 50 act as the support bearing ring and eliminate the need for the extra part. Thus, the support-bearing rolling element 10 that is typically in contact with the support bearing ring may be in contact with the spindle 30 at the support bearing portion 50 instead. This may allow for a reduced cost by eliminating a part and allow for easier assembly. The raceway of the support bearing portion 50 may be called a support-bearing inner raceway 50. The support-bearing inner raceway 50 may be a curved profile or circumferential chamfer to have the ability to accommodate one or more rolling elements 10.

An outer ring 20 may be located on and circumscribing the spindle 30. The outer ring 20 includes an outer circumferential surface 36, an inner circumferential surface 37, and a radial side 38 that extends radially inward from the outer surface 36. The outer ring 20 may move along the torque input portion 32 and the support bearing portion 50 when torque is applied. The outer ring 20 may also include a groove that creates a support-bearing outer raceway 60. The outer raceway 60 is curved and extends from the inner circumferential surface 37 to the radial side 38. The support bearing outer raceway 60 may align with the surface of the support bearing portion 50 of the spindle 30 to create a channel to house rolling elements 10, e.g., the ball bearings shown in FIG. 2. The rolling elements 10 that are located in the channel between the surface of the outer ring and support bearing portion 50 of the spindle 30 may also be referred to as support-bearing rolling elements 10. The support-bearing rolling elements 10 may be larger, have a different size, or different shape than the balls arranged in the channel between the ball nut and spindle. The support-bearing rolling elements 10 may not work in conjunction with the ball nut 40.

As shown in FIG. 2, the outer ring 20 of the ball screw drive 1 may be absent of an inner ring that is typically found in a ball-screw drive. Instead, the outer ring 20 works in conjunction with a surface of the spindle 30, namely the support bearing portion 50, to form a channel to accommodate the support-bearing rolling elements 10. Thus, the support bearing rolling elements 10 are in contact with a surface of the spindle 30 at support bearing portion 50. The outer ring 20 may act as a support bearing when a torque is applied to the torque input portion 32 of the spindle 30. The groove on the spindle in the support bearing portion 50 that creates a raceway for the support bearing of the ball screw maybe be formed in the same cold forming process as the groove on the spindle in the body portion that creates a raceway for the ball screw drive.

Figure 3:
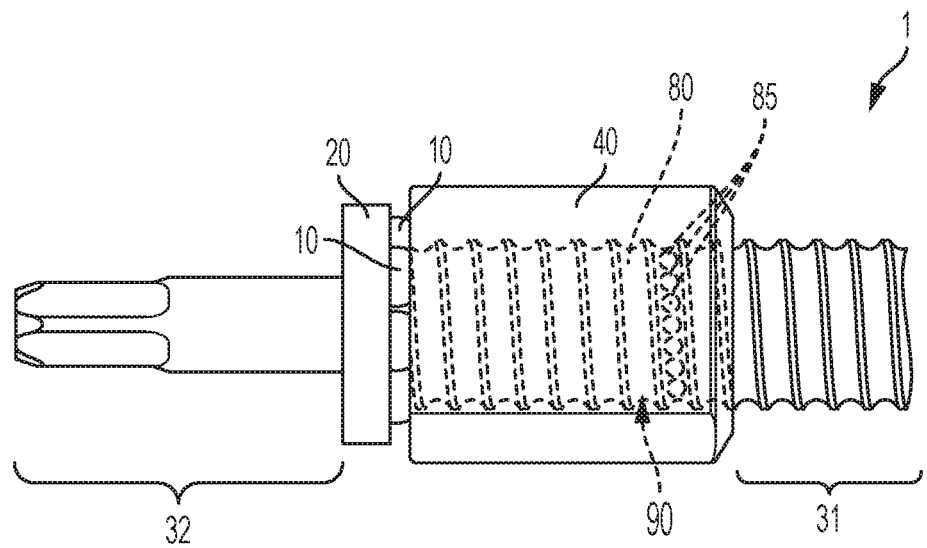
FIG. 3 discloses a side-view of a fully assembled support bearing and ball screw.

As shown in FIG. 3, a side-view of a fully assembled support bearing, and ball screw shows that a gap exists between the outer ring 20 and the ball nut 40 of the ball screw drive 1. The ball screw drive 1 may comprise a ball nut 40 arranged on a spindle 30. The ball nut 40 may typically include a nut element and deflecting elements behind each other on the periphery of the ball nut. The ball nut 40 and the spindle 30 may include ball channels in which balls roll. The deflecting elements may have the function of deflecting the balls out of end of the ball channel to a beginning of another ball channel. The ball screw drive may include multiple channels with respective deflecting elements associated to each ball channel. The balls may include multiple balls which may be smaller in size than the support-bearing rolling elements 10. Within that gap, there may be rolling elements 10 that are exposed between the space of the ball nut 40 and the outer ring 20. Although not shown, the ball nut 40 may have additional spindle rolling elements that move along the raceway of the body portion 31 of the spindle 30. The balls arranged within the ball nut may be smaller than those of the rolling elements 10.

Figure 4:
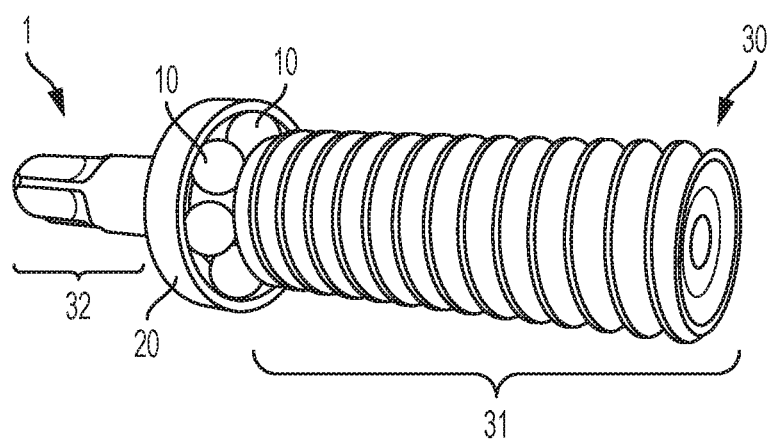
FIG. 4 discloses a perspective view of a spindle and the support bearing assembly.

FIG. 4 illustrates an embodiment of the spindle and support bearing assembly from a perspective view without the ball nut shown. The ball screw drive 1 may have a spindle that includes a body portion 31 and torque input portion 32. Therebetween may be an outer ring 20 that acts as support bearing and sits in proximity with the support-bearing portion 50. Furthermore, the ball nut 40 may cover a portion of the body portion 31 of the spindle 30. However, the ball nut 40 may not come in contact with the outer ring 20, leaving a gap between the two parts that allows the rolling elements 10 to be exposed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST 1 ball screw drive
10 support-bearing rolling element
20 outer ring
30 spindle
31 body portion
32 torque input portion
40 ball nut 50 support-bearing portion
60 support-bearing outer raceway
70 ball-nut inner raceway
80 ball-nut outer raceway
85 ball-nut rolling elements
90 ball-nut channel The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

What is claimed is:

1. A ball screw drive, comprising:
a spindle including a torque input portion defining a first outer circumferential surface and a body portion defining a second outer circumferential surface that has a larger diameter than a diameter of the first outer surface and defines a ball-screw drive inner raceway, wherein the spindle further includes a transition portion connecting between the body portion and the torque input portion and defining a curved support-bearing inner raceway grooved into a surface of the spindle to extend from the first outer surface to the second outer surface;
a ball-nut comprising a nut element and a plurality of deflecting elements;
an outer ring including a third outer circumferential surface having a diameter that is larger than the diameter of the body portion, an inner circumferential surface having a diameter that is larger than the diameter of the torque input portion and smaller than the diameter of the body portion, and
an axial side extending from the third outer surface towards the inner surface, the outer ring defining a curved support-bearing outer raceway that extends from the axial side to the inner surface, wherein the inner and outer raceways cooperate to form a channel; and
one or more ball bearings arranged in the channel and directly contacting the inner and outer raceways,
wherein the outer ring and the ball-nut are arranged so that to create a gap, wherein at least portions of one or more support-bearing rolling elements located between the ball-nut and the outer ring are exposed via the gap.

2. The ball screw drive of claim 1, wherein the ball-screw drive inner raceway ends at the support-bearing inner raceway.

3. The ball screw drive of claim 1, wherein the support-bearing outer raceway and inner raceway are mirrored to one another.

4. The ball screw drive of claim 1, wherein the ball-nut includes a ball-nut outer raceway.

5. The ball screw drive of claim 4, wherein the ball-screw drive includes one or more ball-nut rolling elements that are smaller than the one or more ball bearings.

6. The ball screw drive of claim 4, wherein the support-bearing inner raceway is configured so that one or more ball-nut rolling elements are configured to not contact the one or more ball bearings during linear movement of the ball screw drive.

7. A ball screw drive, comprising:
a support bearing including an outer ring having an inner circumferential surface, and a curved support-bearing outer raceway that extends from the inner circumferential surface to an axial side;
one or more support-bearing rolling elements; and
a spindle that includes:
a body portion including a ball-screw drive inner raceway;
a ball-nut comprising a nut element and a plurality of deflecting elements;
a torque input portion configured to transfer torque from a vehicle actuation system; and
a support bearing portion of the spindle is between and connects the body portion and torque input portion, wherein the support bearing portion includes a curved support-bearing inner raceway with a circumferential groove into a surface of the spindle that is not perpendicular to an axial direction of the spindle, and forming a channel with the outer ring to accommodate the one or more support-bearing rolling elements, wherein the one or more support-bearing rolling elements is in contact with the spindle,
wherein the outer ring and the ball-nut are arranged so that to create a gap, wherein at least portions of the one or more support-bearing rolling elements are exposed via the gap.

8. The ball screw drive of claim 7, wherein the vehicle actuation system is a parking brake actuation system.

9. The ball screw drive of claim 7, wherein the vehicle actuation system is a brake boosting actuation system.

10. The ball screw drive of claim 7, wherein the support bearing does not include an inner ring.

11. The ball screw drive of claim 7, wherein the ball screw drive includes the ball-nut accommodated along the body portion and includes a ball-nut outer raceway that forms a channel with the ball-screw drive inner raceway of the spindle.

12. The ball screw drive of claim 11, wherein the outer ring and the ball-nut are arranged so as to not contact each other.

13. A ball screw drive, comprising:
a support bearing;
a spindle including a torque input portion having a first outer circumferential surface,
a body portion having a second outer circumferential surface that defines ball-screw threads, and
a transition portion connecting between the body portion and the torque input portion and defining a curved support-bearing inner raceway extending from the first outer surface to the second outer surface;
a ball-nut comprising a nut element and a plurality of deflecting elements on a periphery of the ball-nut;
an outer ring including a third outer circumferential surface, an inner circumferential surface, and an axial side extending inward from the third outer surface, the outer ring defining a curved support-bearing outer raceway that extends from the axial side to the inner surface; and
one or more ball bearings arranged between the spindle and the outer ring and directly contacting the inner and outer raceways
wherein the outer ring and the ball-nut are arranged so that to create a gap, wherein at least portions of one or more support-bearing rolling elements located between the ball-nut and the outer ring are exposed via the gap.

14. The ball screw drive of claim 13, wherein a diameter of the third outer surface is larger than a diameter of the second outer surface.

15. The ball screw drive of claim 13, wherein the support bearing does not include an inner ring.

16. The ball screw drive of claim 13 further comprising:
the ball-nut circumscribes the body portion; and one or more ball-nut rolling elements disposed between the ball-nut and the threads.

17. The ball screw drive of claim 16, wherein the one or more ball-nut rolling elements are smaller than the one or more ball bearings.

\* \* \* \* \*